Aug. 7, 1923.  
J. W. MARTIN  
1,464,438  
STARTING CRANK HOLDER FOR AUTOMOBILES  
Filed Jan. 26, 1922
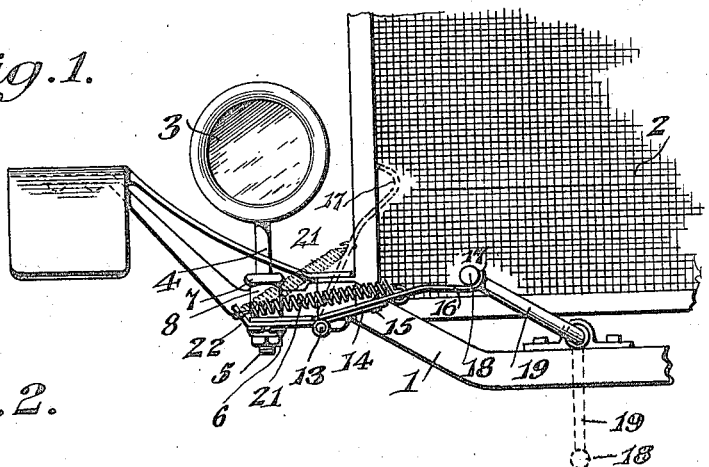
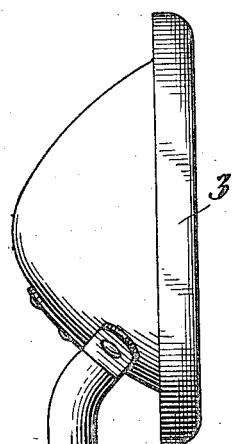
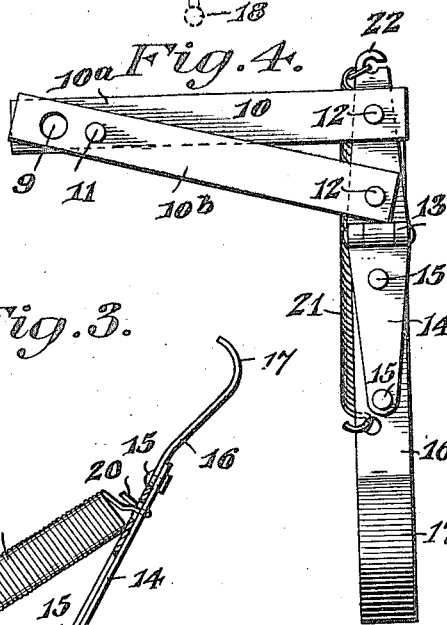
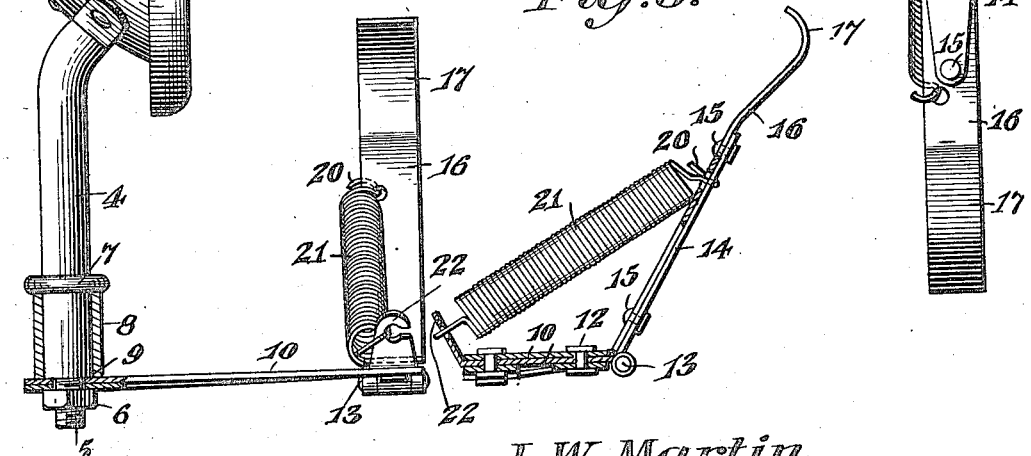
J. W. Martin, INVENTOR.
BY Geo. F. Kimmel, ATTORNEY.

Patented Aug. 7, 1923.

1,464,438

UNITED STATES PATENT OFFICE.

JORGEN W. MARTIN, OF MORA, MINNESOTA.

STARTING-CRANK HOLDER FOR AUTOMOBILES.

Application filed January 26, 1922. Serial No. 531,892.

*To all whom it may concern:*

Be it known that I, JORGEN W. MARTIN, a citizen of Norway, residing at Mora, in the county of Kanabec and State of Minnesota, have invented certain new and useful Improvements in Starting-Crank Holders for Automobiles, of which the following is a specification.

This invention has reference to starting crank holders for automobiles, especially automobiles of Ford type.

In the Ford automobile as equipped at the factory, the starting crank handle pendently and loosely swings from side to side under the action of shocks and jars imparted to it in the course of travel of the automobile.

It is the object of the invention to provide a steady and rigidly supported crank holder which may be attached to the automobile running gear by the utilization of parts already existing on such running gear so that the crank is held comparatively rigid at a median elevation under ordinary running conditions, but may be quickly released from such position for ordinary cranking purposes without interfering with such operations.

The crank supporting attachment for the automobile is of a nature to be substantially unobtrusive and also of small cost so that it may be placed upon the market at such little expense as to compete with other forms of crank holders.

In accordance with the invention, the usual head light post on one side of the Ford automobile is utilized as a holding means for the crank holder to rigidly hold the invention in place, and such crank holder includes an extensible and contractible spring supporting the crank holder in a normally elevated position with the spring strong enough to hold the crank in a partially elevated position while at the same time permitting the release of the crank from the holder when desired.

The invention includes a bracket which may be secured to the head light post on the left hand side of the radiator of the machine as viewed from in front. The bracket is held rigidly in position and to it is hinged an arm terminating at the free end in a hook-like arrangement to receive the handle end of the starting crank, while an extension spring is provided for holding the hinged portion in a somewhat elevated position, but the arrangement is such that the crank handle may be readily released when moved in the cranking direction, in turn releasing the arm held by the spring to rise out of the way of the starting crank on continuing its rotation in the operation of cranking.

The invention will be best understood from a consideration of the following detailed description taken in connection with the accompanying drawings forming part of this specification, with the understanding however that the invention is not confined to any strict conformity with the showing of the drawing, but may be changed and modified so long as such changes and modifications mark no material departure from the salient features of the invention as expressed in the appended claims.

In the drawing:—

Figure 1 is a front elevation of a portion of a Ford automobile showing the invention applied.

Fig. 2 is a side elevation of the structure illustrated in Fig. 1, with the invention applied and some parts shown in cross section.

Fig. 3 is a view partially in elevation and partially in section of the structure embodying the invention but omitting other parts shown in Figs. 1 and 2.

Fig. 4 is a plan view of the structure shown in Fig. 3.

Referring to the drawing, there is shown in Fig. 1 a portion of the front end of a Ford automobile, including the chassis frame 1, radiator 2, one headlight 3, and post 4 on the headlight.

At the lower end of the post 4 there is provided a screw threaded extension 5 to receive a locking nut 6 and above the locking nut, the post 4 is furnished with a flange 7 so that when the nut 6 is applied to the threaded end 5 of the post 4, the post 4 is clamped to a bracket 8 sustaining the headlight 3.

The threaded end 5 of the post 4 traverses a passage or perforation 9 in one end of an arm or bracket 10, which may be a divergent arm made up of two arms 10ª, 10ᵇ, joined together at the end adjacent to the perforation 9 by a rivet 11 and at the other end spaced apart and connected by rivets 12 to a hinge 13 thereby strengthening and rendering the arm 10 of rigid construction.

The rivets 12 serve to connect the arms or strips 10 to the hinge 13 and the latter is in turn connected to another hinge arm or member 14 by rivets 15. It is to be understood however that the particular structure described is not at all obligatory, but in its practical embodiments may be quite materially changed so long as its functions are retained.

The rivets 15 serve to secure a strip 16 to the arm 14 and the strip 16 has an outer or free end 17 bent into the form of a curve forming a shallow loop shaped to receive and retain a handle end 18 of the starting crank 19 of the automobile.

The strip or arm 16 is provided about midway of the frame with a perforation 20 to receive one end of an extension helical spring 21, the other end of which is connected by a hook 22 adjacent to the arm 10.

The spring 21 is of a length and of a tension to maintain the arm 16 in a partially elevated position with the strength of the spring 21 such as to rock the arm 16 to an extent which will sustain the handle end of the crank handle in a partially elevated position, but with the spring 21 partially extended.

When the automobile is running the manipulated end of the crank handle 19 is engaged in the curved end 17 of the arm 16 and because of the normal strength of the hinge spring 21 and the presence of the hinge member 13 as well as the relation of the arm or strip 16 and the starting handle 19, the spring 21 is more or less extended and the cranking handle 19 and arm 16 approach alinement wherefore the arm 16 and starting handle 19 are under such longitudinal tension due to the presence of the spring 21, that any tendency of the connected parts to rattle is avoided.

What is claimed is:—

1. In a starting crank holder for automobiles provided with a headlight post, a bracket extending laterally from the post and adapted to be secured in place by the clamp nut normal to the post, a hinge carried by the bracket and terminating at the end remote from the hinge in a curved extremity adapted to receive and hold the handle end of the starting crank, and an extension spring between the bracket and the hinged arm having a normal tendency to hold the outer end of the hinged arm in elevated position.

2. In an automobile, a starting crank holder, an extended support projecting from the headlight post at right angles thereto and provided with means for securing it to a fixed part of the automobile chassis, a hinged member with one end fast to the laterally extended support, with the other end formed into a carrier for the handle end of the starting crank of the automobile, and a coiled spring connected at one end to the hinged member and at the other end to the fixed part of the support.

3. In an automobile, a starting crank holder, a laterally extending support therefor with means for securing it to a fixed part of the automobile chassis, a hinged member with one end fast to the laterally extended support, and at the other end formed into a hook constituting a carrier for the handle end of the starting crank of the automobile, and a spring having a normal tendency to contract and connected at one end to an intermediate part of the hinged member and at the other end to a fixed part of the support.

4. In an automobile starting crank holder, a laterally mounted support, an intermediately hinged member fast at one end to the support, a normally retractible spring connected to the hinged member on opposite sides of the hinged connection, with one terminal of the hinged member forming a seat for the handle of the automobile starting crank, and an extension spring connecting an intermediate part of the hinged member with the fixed part of the crank holder.

In testimony whereof, I affix my signature hereto.

JORGEN W. MARTIN.